United States Patent Office 3,470,404
Patented Sept. 30, 1969

3,470,404
ROTORS FOR ROTATING ELECTRIC MACHINES
Erik Agerman, Åke Lindstedt, and Nils-Erik Nilsson, Vasteras, Sweden, assignors to Allmanna Svenska Elektriska Aktiebolaget, Vasteras, Sweden, a Swedish corporation
Filed June 30, 1966, Ser. No. 561,906
Claims priority, application Sweden, June 30, 1965, 8,612/65
Int. Cl. H02k 15/02
U.S. Cl. 310—42   4 Claims

ABSTRACT OF THE DISCLOSURE

A rotor ring is connected to a central supporting structure in such a way that free radial expansion of the rotor ring is allowed. Concentricity is maintained without using resilient or adjustable guiding elements. The support bars are furnished with collars intended to overlap recesses in the end plates to the supporting structure and machined to fit, with means for their attachment to the rotor ring prior to erection. Finally the collars are welded to the end plates.

---

The present invention relates to a rotor for a rotating electric machine, preferably a water power generator with vertical shaft, which rotor comprises a rotor disc and a rotor ring supported by the rotor center which rotor ring supports the poles and winding of the rotor.

During the operation of a rotating electric machine the rotor ring, because of the rotation, is especially subject to strong centrifugal forces. In order to give the rotor a construction which has sufficient dynamic stability at different speeds, the rotor ring has previously been attached in a condition in which it is subjected to a high radial pre-stress either by shrinking it on the rotor disc or by loading it with radial pressure rods. Such a construction of the rotor is, however, very expensive and demands great accuracy during manufacture and erection.

The object of the present invention is to effect a rotor construction which demands relatively little accuracy in manufacture and hence is especially suitable for erection at its place of operation and which also is cheap and simple to manufacture. The invention is characterised in that the rotor ring in unloaded condition is fastened to the rotor disc with attachment means arranged to allow free radial expansion of the rotor ring. By allowing the rotor ring to freely expand radially it is, when the rotor is at a standstill, completely unloaded and thus not subject to any pre-stress in a radial direction. The invention is based on the idea that the radial forces which arise due to the centrifugal force should be taken up within the rotor ring during radial expansion of the same, and thus no expensive devices or measures for effecting pre-stress in the rotor ring are necessary.

The attachment means between the rotor disc and rotor ring are according to the invention preferably constructed in such a way that the rotor disc supports a number of U-shaped slide bars and the rotor ring supports a number of guide rails matching the U-channels of the slide bars. In this way it is in an easy way possible to allow the rotor ring to freely expand radially, while on the other hand tangential torque forces are transferred from the rotor shaft and rotor disc to the rotor ring. For regulating the width of the guide rails, wedges are preferably used and the guide rails themselves can according to the invention consist of wedges sliding against each other. At the sliding surfaces which permit the radial expansion of the rotor ring, preferably according to the invention, coatings of plastic or the like friction reducing material are provided. Polytetrafluoroethylene is especially suitable as friction reducing material.

The invention will in the following be further described with reference to the attached drawings which schematically show in FIG. 1 an axial projection of a sector of a rotor according to the invention and in FIG. 2 an enlarged perspective view of a part of FIG. 1.

Figure 1:
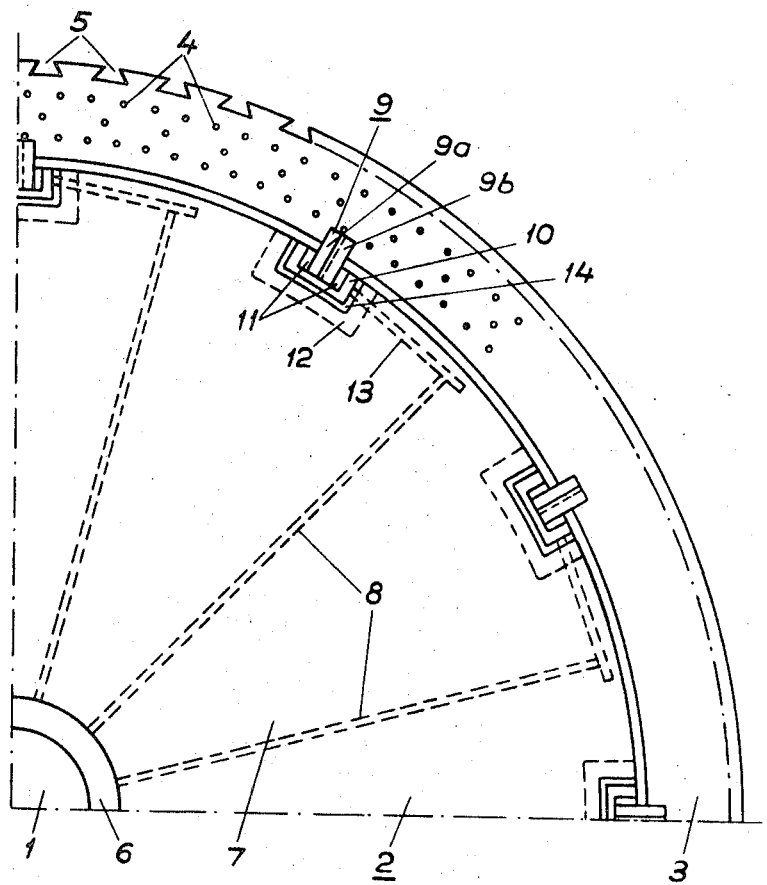
Figure 2:
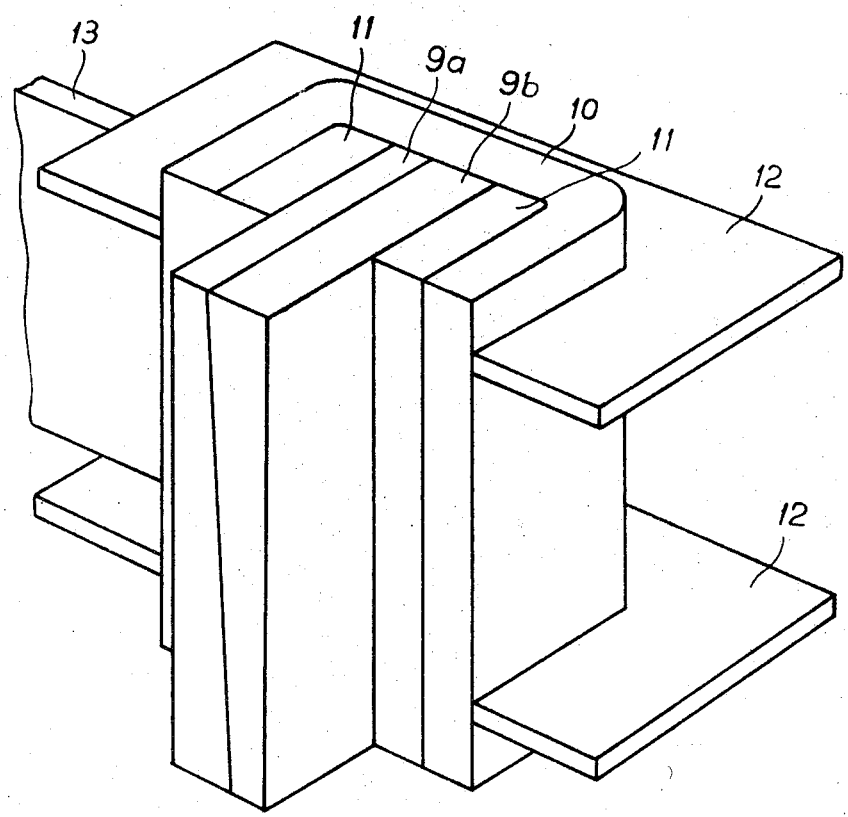

In FIG. 1, 1 designates the rotor shaft, 2 the rotor disc, and 3 the rotor ring. The rotor ring 3 is made up of a number of plate sectors laid on top of each other which overlap each other and are held together by a large number of axial screw bolts 4, so that a rigid uniform rotor ring is obtained. The rotor ring is provided on the outside with a number of dovetail slots 5 for keeping in position the rotor poles and the winding which have not been shown in the figure. The screw bolts 4 and the dovetail slots 5 have been completely drawn only within a limited area of the figure. The rotor disc 2 consists of a hub ring 6 and two end plates 7 laid at a distance from each other, together with web plates 8 stiffening these plates.

On the inside of the rotor ring 3 a number of guide rails 9 are arranged, which are engaged in slots in the rotor ring 3. The rotor disc 2 has a corresponding number of U-shaped slide bars 10 (see FIG. 2), the U-channels of which hold the guide rails 9, the guide rails 9 can slide radially in relation to the slide bars 10 so as to constitute attachment means keying into slots in the inside surface of the rotor ring and this means that the rotor ring 3 can expand under the influence of the centrifugal force, this expansion not influencing the torque transmission between the rotor disc and the rotor ring.

The guide rails 9 may consist of two wedge-formed parts 9a and 9b or possibly three or more parts, which facilitates the fitting in the inner slots of the rotor ring. In order to obtain a good fit between the slide bars 10 which constitute axially directed ring support bars and the guide rails 9 one or more additional fitting wedges or filling pieces are provided. The fitting elements 11 can also be used for adjusting the relative tangential position between the slide bar and the guide rail.

Slide surfaces for the radial expansion of the rotor ring 3 are arranged either between the guide rails 9 and the fitting elements 11 or between these elements and the guide rails 10. A friction reducing surface coating, for example of polytetrafluorethylene is, in any suitable way, arranged at the slide surfaces.

A rotor according to the invention is suitably manufactured in such a way that the slide bars 10 during erection of the rotor are arranged movable in relation to the rotor disc, so that, during the assembly, they are guided by the rotor ring and are first definitely fastened to the rotor disc when the rotor ring is substantially completely assembled. This procedure makes it possible to build up the rotor, so to say, starting from the rotor ring. Thereby the advantage is gained that the rotor disc can be manufactured without very high demands for accuracy, since, during the critical part of the assembly, that is, while joining the rotor ring and the rotor disc, it is possible to make an adjustment, in spite of the fact that both rotor ring and rotor disc are substantially completely assembled. The bore for the rotor shaft in the rotor disc must, of course, be bored as one of the last steps of the assembly, but this can be carried out in a way known per se. In order to avoid deformations of the slide bars 10 during welding, these are beforehand provided with mounting plates 12 that constitute radially directed attachment parts, which are welded to the end plates 7 of the rotor center. In order to effect a favourable transmission of the tangential forces between the slide bars 10 and the rotor disc 2, the bars 10, are, also beforehand, provided with tangentially protruding attachment members 13, which are welded on to the ends of the web plates 8. The mounting plates 12 and the attachment members 13 are welded to the slide bars 10 before these have been accurately machined, in order to avoid form changes in the complete bars, caused by the welding heat. Due to the fact that the exact position of the slide bar 10 in relation to the rotor center is fixed first during the assembly, it is essential that the fitting permit adjustments. The embodiment shown having tangential attachment members 13 is especially well adapted for tangential adjustment and at the same time also for small radial adjustments. A recess 14 sufficiently large for required adjustments (that is, large than ring support bars 10 but smaller than the attachment parts 12), must of course be arranged in the periphery of the end plates 7 at the slide bars 10.

The invention is not limited to the embodiments shown but several variations and modifications are feasible within the scope of the following claims.

We claim:

1. A method of assembling a dynomo-electric machine rotor comprising a rotor ring and a supporting structure for said ring, said supporting structure comprising axially directed ring-support bars, a hub, axially spaced end plates and a plurality of radially extending web plates stiffening said end plates, said ring-support bars being provided with attachment means keying into axially extending slots in the inside surface of the rotor ring, the attachment means being arranged to allow free radial expansion of the rotor ring, said method comprising the steps of assembling a plurality of segments to constitute said rotor ring, providing said end plates with a plurality of recesses in their outer peripheries, the radial and tangential dimensions of the recesses exceeding the corresponding dimensions of a support bar by an amount sufficient for adjustment play, providing said support bars with radially projecting attachment parts prior to machining to make the bars fit with said attachment means, arranging said supporting structure substantially coaxially within the rotor ring, attaching the support bars to the rotor ring by means of said attachment means and finally of welding said radially projecting parts to said end plates.

2. A dynamo-electric machine rotor comprising a rotor ring and a supporting structure therefor, said supporting structure comprising axially oriented ring-support bars, a hub, axially spaced end plates secured to said hub and a plurality of radially extending web plates stiffening said end plates, said ring-support bars being provided with attachment means keying into axially extending slots in the inside surface of the rotor ring, the attachment means being arranged to allow free radial expansion of the rotor ring, the improvement comprising recesses formed in said end plates between said web plates and radially projecting attachment parts rigidly fixed to said support bars, the support bars being arranged in said recesses with substantial play, each of said attachment parts overlapping a recess and being welded to one of said end plates.

3. A rotor as claimed in claim 2, in which the support bars are U-shaped and the attachment means are located in the U-shaped channels of the support bars.

4. A rotor as claimed in claim 3, in which friction-reducing coatings are employed on sliding surfaces between the support bars and the attachment means.

References Cited

UNITED STATES PATENTS

| | | | |
|---|---|---|---|
| 873,160 | 12/1907 | Mug | 310—269 |
| 1,687,512 | 10/1928 | Reist | 310—261 |
| 1,844,710 | 2/1932 | Wood | 310—261 |
| 2,994,793 | 8/1961 | Sills | 310—157 X |
| 3,046,426 | 7/1962 | Gynt | 310—267 |
| 3,112,420 | 11/1963 | Meyer | 310—261 |

WARREN E. RAY, Primary Examiner

U.S. Cl. X.R.

29—598; 310—157, 269